United States Patent
Endoh

(10) Patent No.: US 6,222,585 B1
(45) Date of Patent: Apr. 24, 2001

(54) SEMICONDUCTOR DEVICE HAVING A PIXEL PROTECTIVE CIRCUIT

(75) Inventor: Tsutomu Endoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/942,416

(22) Filed: Oct. 16, 1997

(30) Foreign Application Priority Data

Oct. 16, 1996 (JP) .................................................. 8-273612

(51) Int. Cl.⁷ .................................................. H04N 5/335
(52) U.S. Cl. .................................................. 348/294; 348/297
(58) Field of Search .................................. 348/207, 216, 348/222, 239, 243, 244, 294, 297, 298, 299, 311, 312, 314, 315, 316, 302, 303; H04N 5/335

(56) References Cited

U.S. PATENT DOCUMENTS

| | | | |
|---|---|---|---|
| 5,387,933 | * | 2/1995 | Fouilloy et al. .................... 348/294 |
| 5,844,605 | * | 12/1998 | Gorelik ............................... 348/311 |
| 5,867,215 | * | 2/1999 | Kaplan ................................ 348/315 |

FOREIGN PATENT DOCUMENTS

| | | |
|---|---|---|
| 5-158430 | 6/1993 | (JP) . |
| 5-323893 | 12/1993 | (JP) . |
| 7-319418 | 12/1995 | (JP) . |
| 8-105794 | 4/1996 | (JP) . |

OTHER PUBLICATIONS

"Dictionary of Physics, Revised Ed."(published by Baifukan—publication date Oct. 30, 1992).

* cited by examiner

Primary Examiner—Tuan Ho
(74) Attorney, Agent, or Firm—Foley & Lardner

(57) ABSTRACT

A infrared ray sensor comprises a two-dimensional array of pixels each having a bolometer, a scanning circuit having a vertical shift register and a horizontal shift register, a switching section for consecutively selecting pixels one by one based on the outputs of the shift registers, and a monitor section including a power supply monitor, data monitor and a clock monitor. In the case of overtime selection of a pixel, the monitor section disables the switching section for selection of any pixels to thereby protect the sensor against the deterioration or destruction of the pixel.

12 Claims, 6 Drawing Sheets

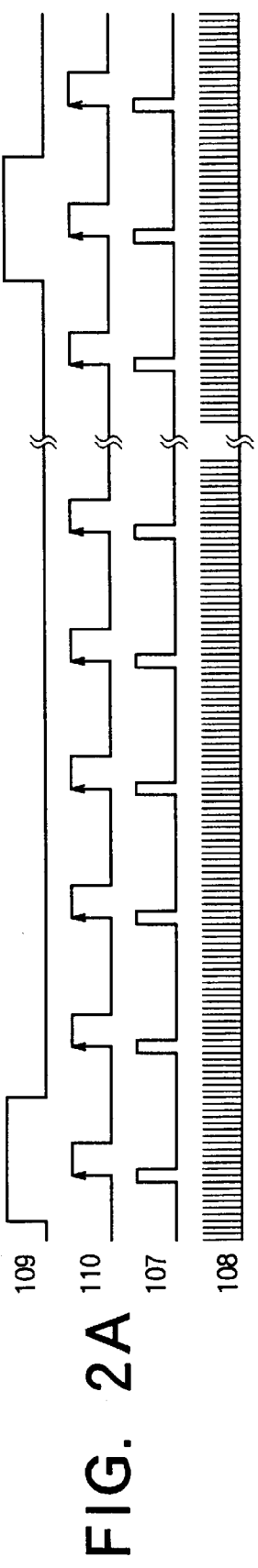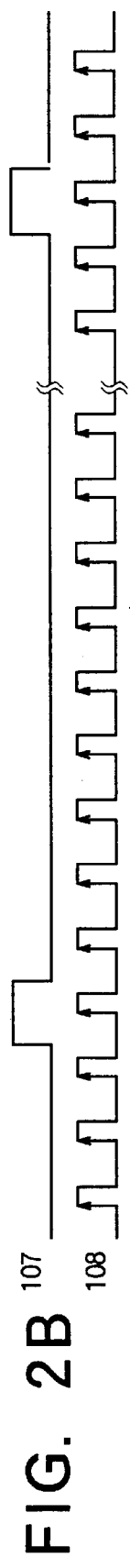
FIG. 2A
FIG. 2B

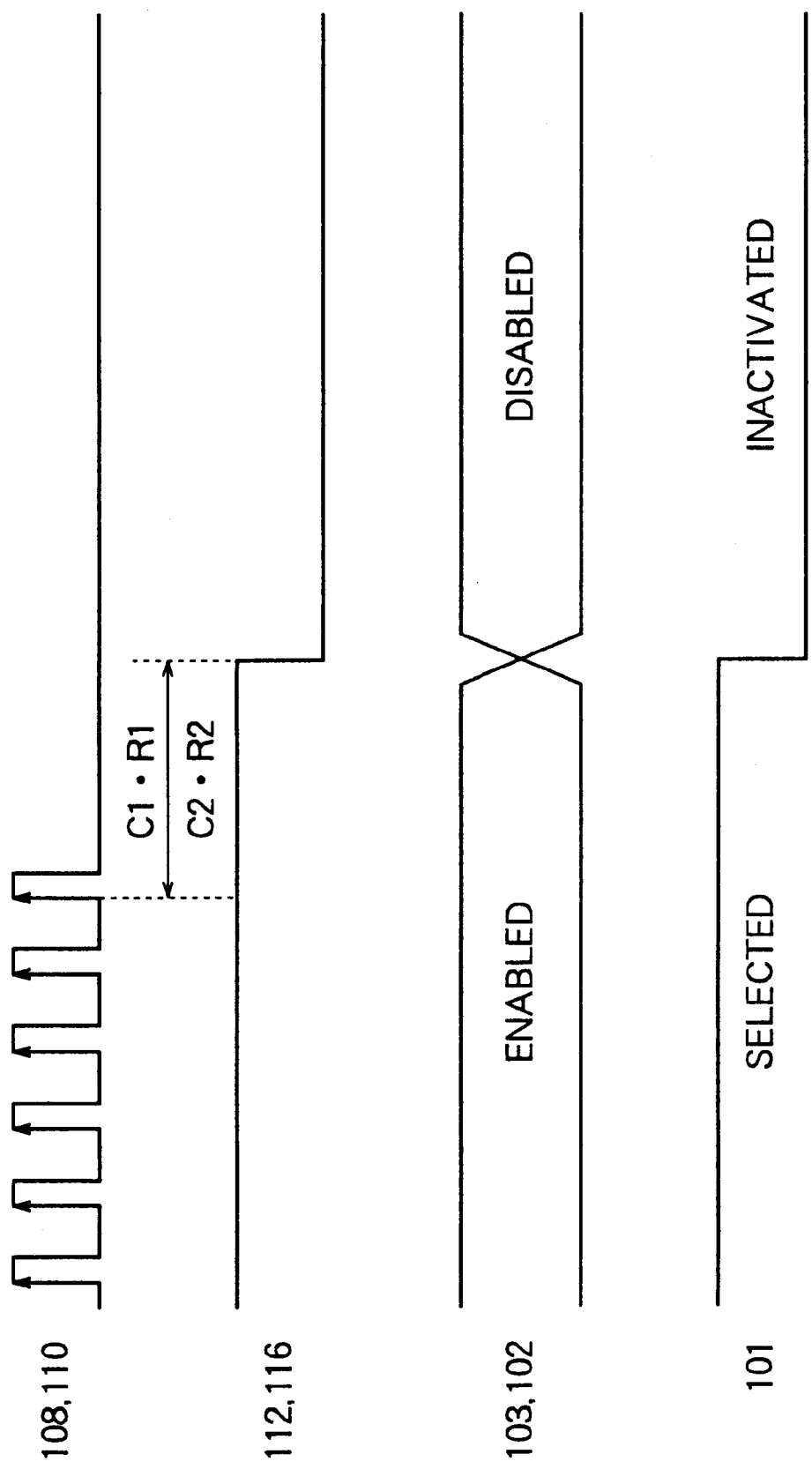

SEMICONDUCTOR DEVICE HAVING A PIXEL PROTECTIVE CIRCUIT

BACKGROUND OF THE INVENTION

(a) Field of the Invention

The present invention relates to a semiconductor device having a pixel protective circuit and, more particularly, to the structure of an address scanning circuit for an array of pixels provided in a semiconductor device.

(b) Description of the Related Art

In a semiconductor device having an X-Y address scanning circuit for a two-dimensional array of pixels, a horizontal shift register and a vertical shift register provided in the semiconductor device feed pixel selecting pulses in sequence. The shift registers consecutively turn on the horizontal switches and vertical switches to read pixel data one by one. The horizontal and vertical shift registers receive clock signals and data signals through respective signal lines for controlling the X-Y address to generate the pixel selecting pulses, as described in Patent Publication No. JP-A-8(1996)-105794.

In a conventional semiconductor device having an X-Y address scanning circuit, if a failure such as a signal stop occurs in a clock signal or data signal, the X-Y scanning circuit may stop the operation thereof or involve a malfunction, which sometime selects a single pixel for a long time. Such a long time selection of a single pixel imposes an overload on the selected pixel to deteriorate or destroy the selected pixel in the semiconductor device. Among the semiconductor devices having an X-Y scanning circuit, an infrared ray sensor is exemplified hereinafter wherein a bolometer is provided for each of pixels for photo-electric conversion.

If a disconnection occurs, for example, in a signal transmission line for controlling the X-Y address of the clock signal or data signal to thereby stop the X-Y scanning circuit or cause a malfunction in the horizontal shift register or vertical shift register, the bolometer of the selected pixel is subjected to overtime current flowing therethrough to be overheated by self heating, which causes characteristic deterioration or burnout destruction of the bolometer. Such a situation is similar in any semiconductor device having an address scanning circuit for an array of pixels.

SUMMARY OF THE INVENTION

It is therefore an object of the present invention to provide a semiconductor device having an address scanning circuit for an array of pixels, which is capable of preventing the characteristic deterioration or burnout destruction of selected pixels.

The present invention provides a semiconductor device comprising a plurality of pixels each having a specified function, a shift register for receiving a data signal and a clock signal to shift the data signal therein based on the clock signal, the shift register having a plurality of stage outputs each for supplying a pixel selecting signal, a switching section for selecting at least one of the pixels at a time based on the pixel selecting signal, at least one signal line for transferring data from or to a selected pixel selected by the switching section, and a monitor section for outputting a disable signal by detecting a case of overtime selection of one of the pixels, the disable signal disabling the switching section for selection of any of the pixels.

In accordance with the present invention, since an overtime selection of a single pixel can be avoided by disabling the switching section for selection of pixels, the characteristic deterioration of burnout destruction of the selected pixel does not take place.

The above and other objects, features and advantages of the present invention will be more apparent from the following description, referring to the accompanying drawings.

BRIEF DESCRIPTION OF THE DRAWINGS

FIGS. 2A and 2B are timing charts,

FIG. 2A showing external input signals for the infrared ray sensor of FIG. 1,

FIG. 2B showing the detail of the specific signals shown in FIG. 2A;

FIG. 3 is an example of timing chart of signals generated in the infrared ray sensor of FIG. 1;

PREFERRED EMBODIMENTS OF THE INVENTION

Now, the present invention is more specifically described with reference to accompanying drawings.

Figure 1:
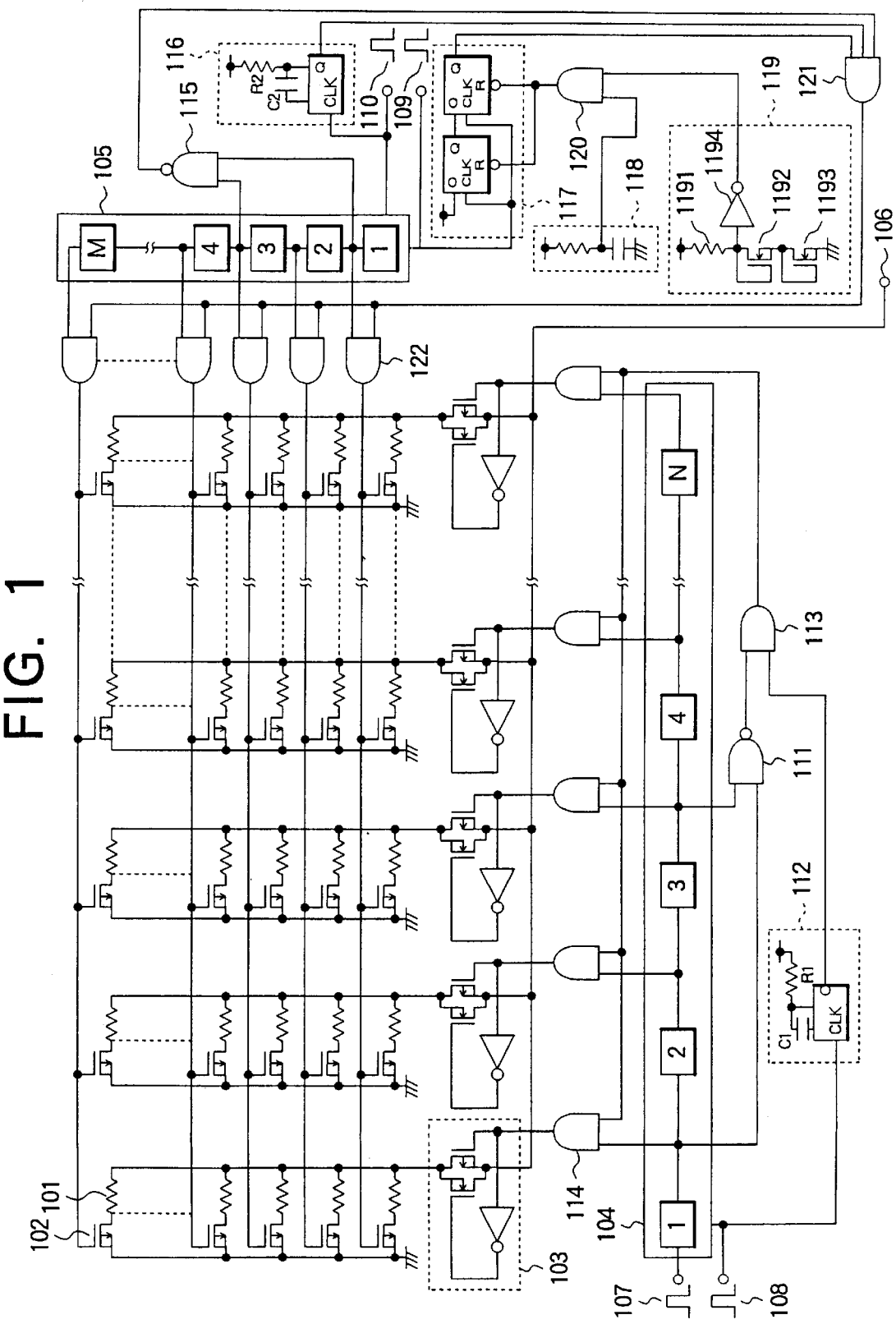
FIG. 1 is a block diagram of an infrared ray sensor as an example of the semiconductor device according to a first embodiment of the present invention.

Referring first to FIG. 1, an infrared ray sensor as an example of the semiconductor device according to a first embodiment of the present comprises a plurality of (N×M) bolometers 101 arranged in a matrix as pixel elements for photo-electric conversion, a plurality of (N×M) vertical switches (MOSFETs) 102 each provided for a corresponding bolometer 101, a plurality of (N) vertical lines or data lines each for reading data therethrough from the bolometers 101 arranged in a corresponding column, a plurality of (M) horizontal lines each connected to the gates of the vertical switches 102 for the pixels arranged in a corresponding row, a plurality of (N) horizontal switches 103 each disposed corresponding to one of the columns of the pixels, a horizontal shift register 104 having a plurality of (N) outputs for driving a corresponding data line through a corresponding horizontal switch 103, a vertical shift register 105 having a plurality of (M) outputs each driving a corresponding horizontal line. Each of the bolometers 101 is connected in series with each of the vertical switches 102 between each data line and the ground.

Each horizontal switch 103 is implemented as a transfer gate formed by a pair of parallel transistor switches and an inverter. An output line 106 is connected to data lines through respective horizontal switches 103. A horizontal data signal 107 is supplied to the input of the horizontal shift register 104, whereas a horizontal clock signal is supplied to the clock input of the horizontal shift register 104. A vertical data signal 109 is supplied to the input of the vertical shift register 105, whereas a vertical clock signal is supplied to the clock input of the vertical shift register 105.

The infrared ray sensor further comprises a monitor section including a horizontal data monitor 111 implemented by a NAND gate for monitoring the horizontal data signal 107 shifted on the outputs of the first stage and another stage of the horizontal shift register 105, a horizontal clock monitor 112 for monitoring the horizontal clock signal 108, a horizontal AND monitor 113 implemented as an AND gate for generating an AND of the output of the horizontal data monitor 111 and the output of the horizontal clock monitor 112, a plurality of (N) horizontal mask AND gate 114 each passing or stopping the data signal from the corresponding output of the horizontal shift register 104 to turn on or off a corresponding horizontal switch 103 based on the output of the horizontal AND monitor 113, a vertical data monitor 115 implemented as a NAND gate for monitoring the vertical data signal 109 shifted on the outputs of the first stage and another stage of the vertical shift register 105, a vertical clock monitor 116 for monitoring the vertical clock signal 110, and a protective section 117 for protecting the infrared ray sensor against an unstable operation upon the turn-on of the sensor due to unstable data in the shift registers 104 and 105.

The monitor section of the infrared ray sensor further comprises a power-on reset section 118 for resetting the protective section 117 upon the power-on of the infrared ray sensor, a supply voltage monitor 119 for monitoring a voltage fall in the supply voltage, a power source AND monitor 120 for generating an AND of the output of the power-on reset section 118 and the output of the supply voltage monitor 119 to generate a reset signal for resetting the protective section 117, a vertical AND monitor 121 for generating an AND of the outputs of the vertical data monitor 115, the vertical clock monitor 116 and the protective section 117, and a plurality of (M) vertical mask AND gates 122 each receiving a corresponding output of the vertical shift register 105 to turn on or off a corresponding vertical switch 102 based on the output of the vertical AND monitor 121. Each of the horizontal clock monitor 112 and the vertical clock monitor 116 is implemented by a mono-stable multivibrator having a trigger input and a combination of time constant elements C1 and R1 or C2 and R2, whereas the protective section 117 is implemented by a pair of flip-flops for monitoring the source line of the sensor.

Referring to FIGS. 2A and 2B showing waveforms of external input signals 107 to 110 and detail of the input signals 107 and 108, respectively, the vertical data signal 109 having a large period compared to the horizontal data signal 107 and the vertical clock signal 110 having a large period compared to the horizontal clock signal 108 are input to the vertical shift register 105, which generates scanning pulses for consecutively selecting the vertical switches 102 one by one.

The horizontal data signal 108 and horizontal clock signal 107 are input to the horizontal shift register 104, which generates scanning pulses to consecutively scan the horizontal switches 103 one by one during the one clock period in the vertical clock signal 110, thereby consecutively reading signals from a row of pixels through the output signal line 106. Upon completion of the read-out of the row of the pixels, the vertical shift register shift the scanning pulse to the next stage to select the next row of the pixels. The horizontal shift register 104 again consecutively selects the horizontal switches 103 on by one to read pixel data from the next row of the pixels, similarly to the case of reading pixle data from the previous row of the pixels.

Suppose that a failure occurs wherein the horizontal data signal 107 input to the horizontal shift register 104 is fixed to the VDD potential or the feed of the horizontal clock signal 108 is stopped due to some defect of the external circuit. In this case, the consecutive scanning is stopped to thereby select a single specific pixel for a long time, which activates the bolometer 101 therein for a long time and deteriorates or destroys the bolometer. A failure in the vertical data signal or vertical clock signal instead may also cause a similar result.

In general, the power consumption $P_0$ in each of the pixels is expressed by the following equation;

$$P_0 = I^2 \cdot R \cdot (T_s/T_0)$$

Wherein I, R, $T_s$ and $T_0$ represent current flowing through the bolometer 101, resistance of the bolometer 101, time length for the selection (selected time) of the pixel and frame time, respectively.

In the infrared ray sensor, a normal or sound scanning operation generally allows the horizontal shift register to consecutively shift therein scanning pulses having a pulse width (or pulse duration) equal to a single clock period, because the input horizontal data signal 107 itself has a pulse width equal to the single clock period. In other words, if a scanning pulse having a pulse width equal to or above two clock periods of the horizontal clock signal is found within the horizontal shift register, it means that a failure occurred in the infrared ray sensor.

In view of the above, the horizontal data monitor 111 monitors whether or not a scanning pulse or data pulse having a pulse width equal to or above three clock periods is shifted within the horizontal shift register 104 in the vicinity of the input of the horizontal shift register 104, by generating an AND of the output of the first stage and the output of the third stage of the horizontal shift register 104. Here, the three clock periods includes a margin of one clock period which prevents a glitch caused by a gate delay. If a scanning pulse having a pulse width equal to or above three clock periods is found in the horizontal shift register from the output "0" of the horizontal data monitor 111, all of the horizontal switches are cut off to thereby protect the sensor against a deterioration or destruction of the pixel.

A normal scanning operation also allows the vertical shift register 105 to shift therein scanning pulses having a pulse width equal to one clock period of the vertical clock signal 110, because the input vertical data signal 109 has a pulse width of the one clock period. In other word, if a scanning pulse having a pulse width equal to or above the two clock periods of the vertical clock signal is found within the vertical shift register, it means that a failure occurred in the infrared ray sensor.

The vertical data monitor 115 monitors whether or not a data pulse having a pulse width equal to or above three clock periods of the vertical clock signal 110 is found within the vertical shift register 105 in the output of the first stage of the vertical shift register 105. Here, the three clock periods again include a margin of one clock period which prevents a glitch caused by a gate delay. If a data pulse having a pulse width equal to or above three clock periods is found in the vertical shift register, all of the vertical switches 102 are cut off to thereby protect the sensor against a deterioration or destruction of the pixel.

Referring to FIG. 3 showing the operation of infrared ray sensor of the present embodiment, the horizontal 108 (or vertical clock signal 110) supplied to the horizontal shift register 104 (or vertical shift register 105) is monitored by the horizontal clock monitor 112 (or vertical clock monitor 116), which is implemented by a mono-stable multivibrator receiving a horizontal clock signal 108 (or vertical clock signal 110) as a trigger signal.

The horizontal clock monitor 112 outputs an enable signal to allow the horizontal switches 103 to select a specified data line when a normal horizontal clock signal 108 is supplied thereto. If the horizontal clock signal 108 is stopped, the output of the horizontal clock monitor 112 falls after a time length determined by the time constant $C_1 \cdot R_1$ is elapsed since the stop of the horizontal clock signal, thereby generating a disable signal for the horizontal switches 103 to protect the sensor against the deterioration or destruction of the pixel. The time constant $C_1 \cdot R_1$ is designed so that the bolometer is not destroyed due to the overheating caused by the overtime selection of the specified pixel.

Similarly, the vertical clock signal 110 supplied to the vertical shift register 105 is monitored by the vertical clock monitor 116. The vertical clock monitor 116 outputs an enable signal to allow the vertical switches 102 to select a specified horizontal line when a normal vertical clock signal 110 is supplied thereto, whereas outputs a disable signal to cut off all of the vertical switches 102 when the vertical clocks signal is stopped. The vertical clock monitor 115 generates the disable signal after a time length determined by the time constant $C_2 \cdot R_2$ is elapsed since the stop of the vertical clock signal 110, thereby protecting the infrared ray sensor against the deterioration or destruction of the pixels. The time constant $C_2 \cdot R_2$ is designed so that the bolometers are not destroyed due to the overheating caused by the overtime selection of the specified row of bolometers.

The temperature rise ΔT of the bolometer is expressed by the equation:

$$\Delta T = (I^2 \cdot R \cdot t)/(G_{th} \cdot \tau)$$

wherein I, R, t, $G_{th}$ and $\tau$ represent current flowing through the bolometer, resistance of the bolometer, time length of selection of each pixel, thermal conductance and thermal time constant, respectively. As a specific example, if I=3 mA, R=3 kω, t=1 μs, $G_{th}$=0.25 μW/K and τ=20 ms, then ΔT=5° C. From experiments, there was no observed characteristic deterioration or destruction of bolometer until the bolometer exhibits a temperature rise of ΔT=400° C. due to its self heating.

Accordingly, the time constant $C_1 \cdot R_1$ should be determined based on the time length for selection of pixels which limits the temperature rise ΔT below 400° C. in the bolometer. For example, a temperature rise which is ten times as much as a normal temperature rise ΔT=5° C. by the self heating may be selected, which amounts 10 μs, i.e., ten times as much as time length 1 μs for a normal pixel selection. Thus determined time constant should preferably correspond to the time length which provides a temperature rise in the bolometer equal to or above double or quadruple of the normal temperature rise. This provides a margin for the time constant which may fluctuate as high as ±50% due to the variation of capacitance or resistance in the fabrication process for the semiconductor device, thereby preventing occurrence of malfunction in a normal operation.

Figure 4:
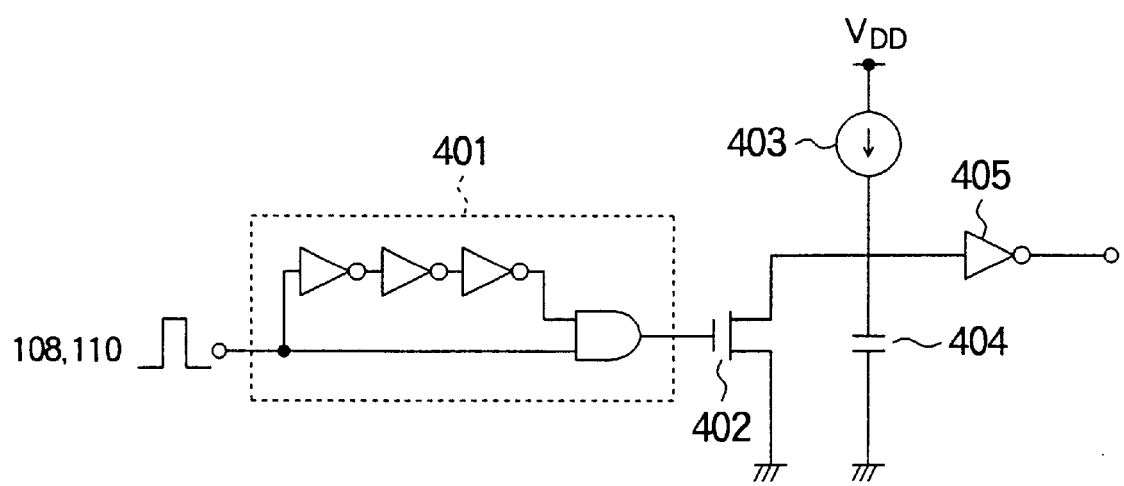
FIG. 4 is a block diagram of an alternative configuration of the horizontal or vertical clock monitor in the first embodiment of the present invention.

As an alternative for the horizontal clock monitor 112 and vertical clock monitor 116 shown in FIG. 1, the circuit shown in FIG. 4 may be used, wherein the clock monitor comprises a constant current source 403 for providing a constant current from a source line $V_{DD}$, an integration capacitor 404 connected between the constant current source 403 and the ground for integration of the constant current, a differential circuit 401 receiving the input clock signal 108 or 110 to generate a differential signal or reset pulse, a reset transistor 402 receiving the output of the differential circuit 401 to discharge the electric charge stored across the capacitor 404, and an output inverter, or output buffer, 405 receiving the integrated output from the capacitor 404 to generate the output of the clock monitor.

Figure 5:
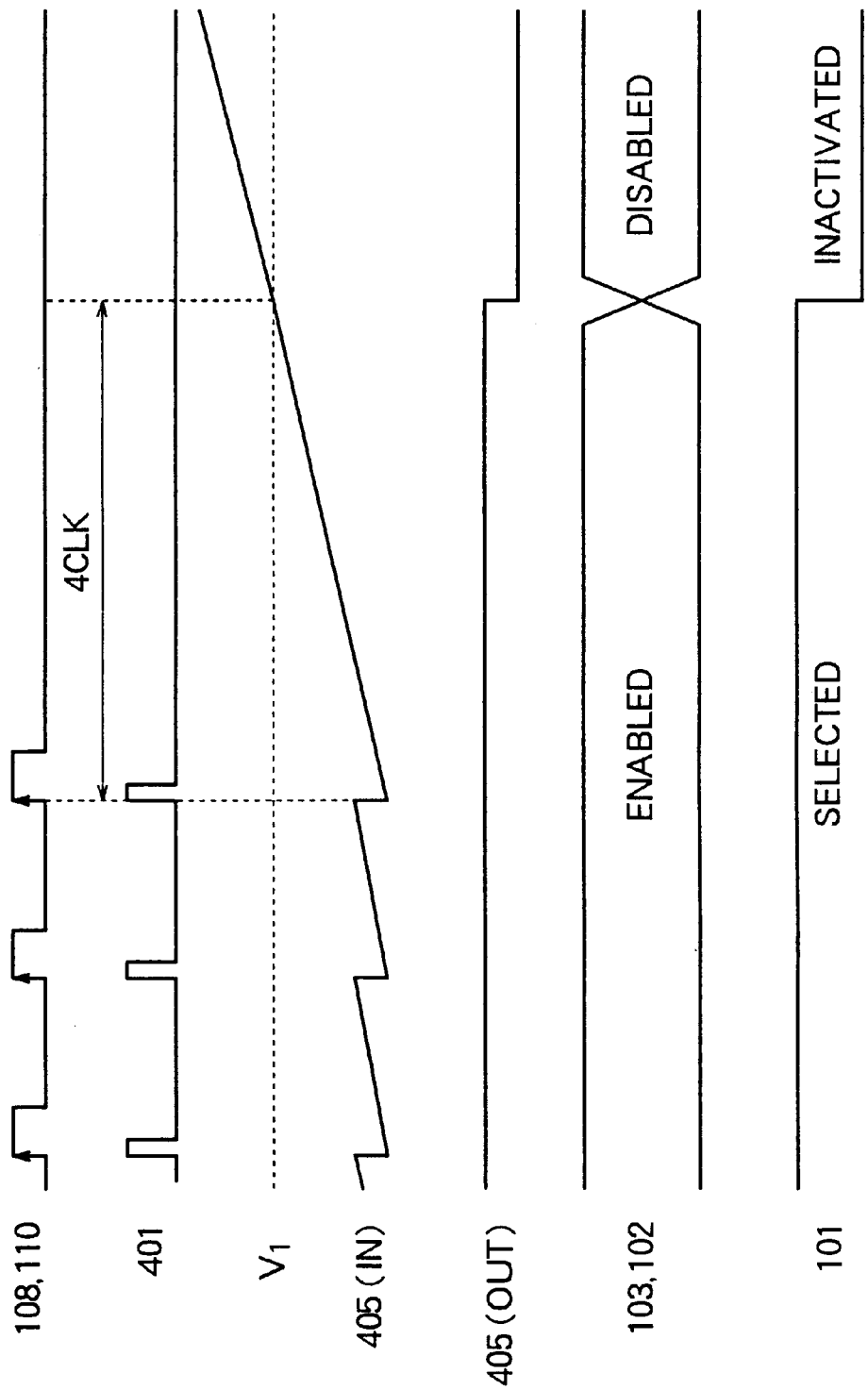
FIG. 5 is a timing chart of signals generated in the infrared ray sensor having clock monitors of FIG. 4.

Referring to FIG. 5 Showing the operation of the clock monitor of FIG. 4, during the off-state of the reset transistor 402, the integration capacitor 404 stores charge supplied from the constant current source 403. The differential circuit 401 generates a reset pulse by responding the rising edge of the input clock signal 108 or 110. The reset pulse turns on the reset transistor 402 to discharge the electric charge stored across the integration capacitor 404 each time a clock pulse appears in the clock signal 108 or 110. If a clock signal 108 or 110 having a normal pulse train is supplied to the differential circuit 401, the output of the integration capacitor 404 or input of the inverter 405 falls to zero responsive to the reset signal before the output of the integration capacitor 404 exceeds the threshold voltage V1 of the output inverter 405. As a result, the switches 102 and 103 operate in a normal operational mode to consecutively activate bolometers 101.

If the clock pulse in the input clock signal 108 or 110 stops for at least a time length corresponding to four clock pulses, then the reset signal is not generated for the time length, which in turn raises the input of the output inverter 405 above the threshold voltage V1 of the output inverter 405. In this case, the output of the output inverter 405 rises to cut off the corresponding switches 102 or 103 and inactivate the bolometer 101.

The output voltage V4 of the integration capacitor 404 appearing across the both terminals thereof can be represented by:

$$V4 = I4 \cdot t4 / C4$$

wherein I4, C4 and t4 represent the constant current from the constant current source 403, capacitance of the integration capacitor 404 and the period of the clock signal, respectively.

In a specific example, wherein the current I flowing through the bolometer is I=3 mA, resistance R of the bolometer is R=3 kω, time length t for pixel selection is t=1 μs, thermal conductance $G_{th}$=0.25 μW/K and time constant τ=20 μs, then the temperature rise ΔT of the bolometer due to its self heating is obtained as follows:

$$\Delta T = (I_2 \cdot R \cdot t)/G_{th} \cdot \tau = 5° C.$$

If the threshold voltage V1 of the output inverter 405 is selected at V1=10 volts and if the design choice is such that the pixel selection is not effected upon the occurrence of a temperature rise that is quadruple the normal temperature rise, the above parameters are selected so that the voltage appearing across the integration capacitor 404 during a normal operation is set at 2.5 volts, i.e., a quarter of the threshold voltage V1=10 (volts).

If, for example, I4=0.1 μA, C4=10 pF and t4=250 μs, then V4=2.5 volts during the normal operation. Accordingly, if a normal vertical clock signal 110 is supplied to the infrared ray sensor, then the voltage across the integration capacitor 404 rises 2.5 volts before it is reset. Otherwise, if the supply of the vertical clock signal is stopped for the time length for the four clock pulses, the voltage across the integration capacitor 404 continues to rise until the voltage reaches to the threshold voltage V1 of the output inverter 405. In this case, the output inverter 405 generates a disable signal for disabling the selection of any of the pixels.

By the above modified configuration of the vertical and horizontal clock monitors, the infrared ray sensor can be reduced in size thereof compared to the first embodiment wherein the mono-stable multivibrator is provided.

The protective section 117 in FIG. 1 protects the infrared ray sensor upon the power-on of the sensor. Specifically, the protective section 117 disables all of the vertical switches 102 for protection of the bolometer 101 after the power-on of the infrared ray sensor until the vertical data signal 109 is supplied for a time length of two clock pulses.

In FIG. 1, the supply voltage monitor 119 comprises a serial connection of a resistor 1191, n-channel field effect transistors (FETs) 1192 and 1193, and an inverter or buffer 1194 having an input connected to a node connecting the resistor 1191 and FET 1192. The supply voltage monitor 119 compares the sum of the source-to-drain voltages of the FETs 1192 and 1193 against the threshold voltage of the buffer 1194 to monitor the drop of the supply voltage. If the voltage is within the normal range, sum of the source-to-drain voltages of both the FETs 1192 and 1193 is lower than the threshold voltage. On the other hand, if the supply voltage falls due to some reason, the threshold voltage of the buffer 1194 falls and the sum of the source-to-drain voltages of the FETs 1192 and 1193 becomes higher than the threshold voltage. As a result, the output of the inverter 1194 is reversed to cut off all of the vertical switches 102 and inactivate the bolometers 101 for protection of the infrared ray sensor.

The protective circuit in the infrared ray sensor having an X-Y scanning circuit can reduce the chip size of the sensor compared to the case wherein a shift register having a reset function is provided in the sensor.

Figure 6:
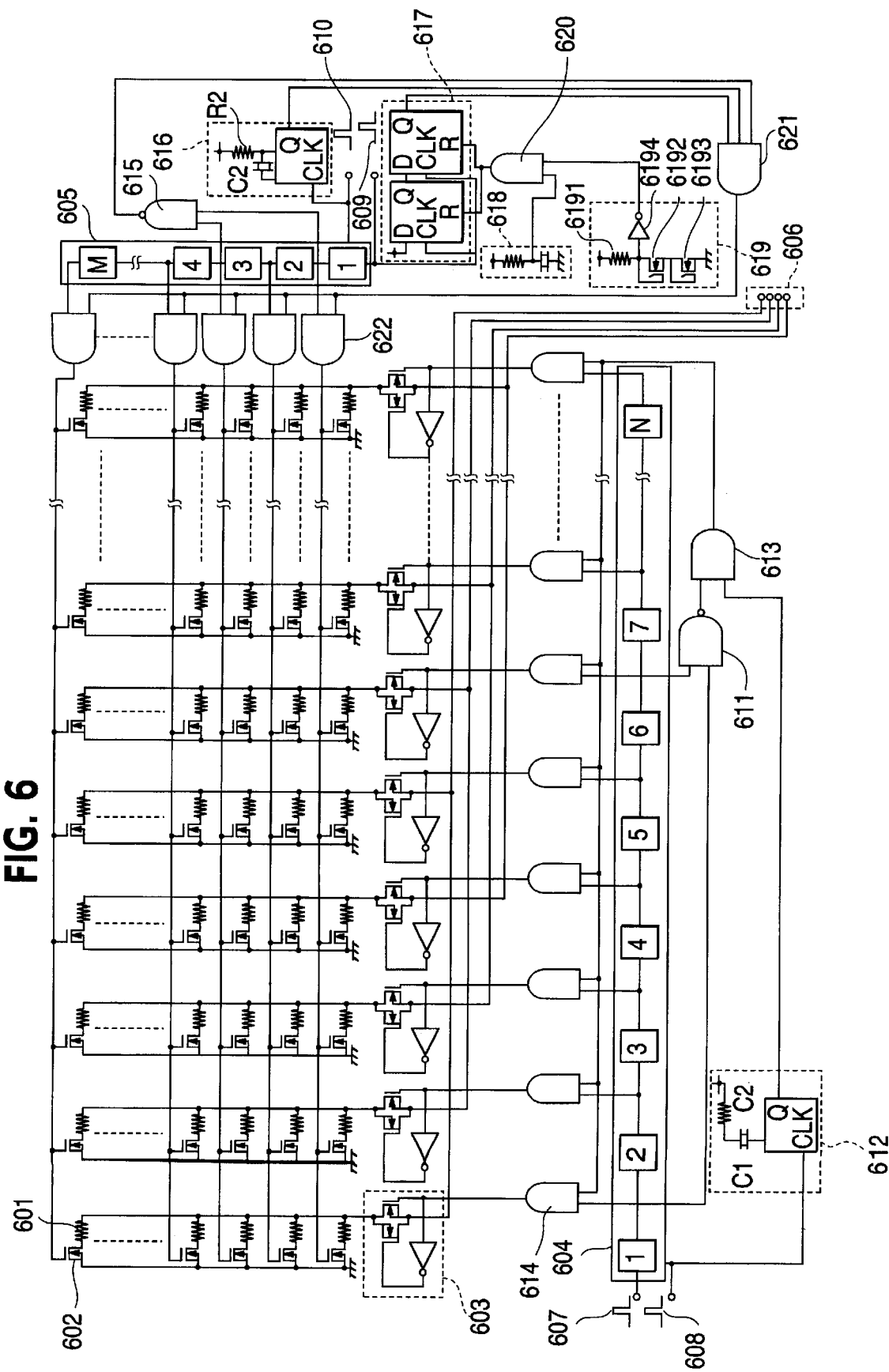
FIG. 6 is a block diagram of an infrared ray sensor as an example of the semiconductor device according to a second embodiment of the present invention.

Referring to FIG. 6, an infrared ray sensor as the semiconductor device according to a second embodiment of the present invention is similar to the first embodiment except for the configuration of the four output signal lines in the present embodiment which are provided for every consecutive four of the pixels arranged in the horizontal direction. In other words, the output line 606 is divided for every four pixel periods in the horizontal direction. In FIG. 6, constituent elements similar to those shown in FIG. 1 are denoted by related reference numerals, wherein the most significant digit of each of the reference numerals is different between both the drawings.

In the configuration of the present embodiment, a horizontal data signal 607 having a pulse width corresponding to four clock periods or pixel periods is generally supplied. In other words, a scanning pulses having a pulse width of four clock periods are shifted in the horizontal shift register 604 so that the data of four pixels are read out simultaneously through the respective output lines 606. If a scanning pulse having a pulse width equal to or above five clock periods is found in the horizontal shift register 604, it means that the sensor is in malfunction.

The horizontal data monitor 611 is implemented by a NAND gate receiving the output of the first stage and the sixth stage of the shift register 604 to output an enable signal to the horizontal switches 602 through the horizontal AND monitor 613.

The horizontal data monitor 611 monitors whether or not a scanning pulse having a pulse width equal to or above six clock periods is found in the horizontal shift register 611 in the vicinity of the input stage thereof. Again, one clock period in the six clock periods is a margin for preventing the occurrence of a glitch caused by a gate delay. If a scanning pulse having a pulse width equal to above six clock periods is found by the horizontal data monitor 611, then all of the horizontal switches 603 are cut off to inactivate the bolometers 601, thereby protecting the sensor against the deterioration or destruction of the pixel.

In a more generalized configuration of the horizontal data monitor for the shift register in the present embodiment, wherein the output line is divided into a number of "n", the horizontal data monitor monitors whether or not a scanning pulse having a pulse width equal to or above n+2 clock periods is shifted in the shift register in the vicinity of the input stage thereof. One clock period in the n+2 clock periods is again a margin for preventing a glitch caused by a gate delay. If a scanning pulse having a pulse width equal to or above n+2 clock periods is found, then all of the switches are cut off to inactivate the bolometers, thereby protecting the sensor against the deterioration or destruction of the pixel.

In the above embodiments, infrared ray sensors having a bolometer for each pixel are exemplarily described. However, the present invention is applicable to any of the semiconductor devices having a one- or two-dimensional scanning circuit, such as display devices, in addition to the sensor. Among the display devices to which the present invention is applicable, a field emission display unit, for example, is especially suitable for application of the present invention, wherein electrons are emitted based on a gate-to-cathode voltage to collide a fluorescent panel for light emission and it is generally known that the fluorescent panel is damaged by a long time and local collision by the electrons. In the field emission display unit, the protective section provided according to the present invention will protect the display unit against the deterioration or destruction of pixels to improve the lifetime of the display unit.

Other examples of the semiconductor devices to which the present invention is applicable include plasma display panel, liquid crystal display, MOS-type image pick-up device etc.

Since the above embodiments are described only for examples, the present invention is not limited to the above embodiments and various modifications or alterations can be easily made therefrom by those skilled in the art without departing from the scope of the present invention.

What is claimed is:

1. A semiconductor device comprising a plurality of pixels each having a specified function, a shift register for receiving a data signal and a clock signal to shift said data signal therein based on said clock signal, said shift register having a plurality of stage outputs each for supplying a pixel selecting signal, a switching section for selecting at least one of said pixels at a time based on said pixel selecting signal, at least one signal line for transferring data from or to a selected pixel selected by said switching section, and a monitor section for outputting a disable signal by detecting a case of overtime selection of one of said pixels, said disable signal disabling said switching section for selection of any of said pixels.

2. A semiconductor device as defined in claim 1 wherein said monitor section includes a power supply monitor for monitoring a power supply of said semiconductor device.

3. A semiconductor device as defined in claim 2 wherein said power supply monitor monitors a voltage fall and/or power-on of said power supply.

4. A semiconductor device as defined in claim 1 wherein said monitor section includes a clock monitor for monitoring said clock signal to output said disable signal by detecting absence of clock pulses in said clock signal for a specified period.

5. A semiconductor device as defined in claim 4 wherein said clock monitor includes a mono-stable multivibrator.

6. A semiconductor device as defined in claim 4 wherein said clock monitor includes a constant current source connected to a first source line, a capacitor connected between said constant current source and a second source line, a differential circuit for receiving said clock signal to generate a differentiated signal therefrom, and a switching transistor, responsive to said differentiated signal, for discharging electric charge stored on a first node connecting said constant current source and said capacitor, and a buffer having an input connected to said first node.

7. A semiconductor device as defined in claim 4 wherein said monitor section further includes a data monitor for monitoring said data signal to output said disable signal by detecting presence of scanning pulses in said data signal for a specified period.

8. A semiconductor device as defined in claim 7 wherein said data monitor includes an AND gate for receiving signals from two of said stage outputs.

9. A semiconductor device as defined in claim 7 wherein said monitor section further includes a power supply monitor for monitoring a voltage fall and/or power-on of said power supply.

10. A semiconductor device as defined in claim 1 wherein said monitor section includes a data monitor for monitoring said data signal to output said disable signal by detecting presence of scanning pulses in said data signal for a specified period.

11. A semiconductor device as defined in claim 1 wherein said pixels are arranged in a two-dimensional array.

12. A semiconductor device as defined in claim 1, wherein said monitor section includes:

a power supply monitor for monitoring a voltage fall in a voltage provided by a power supply of said semiconductor device; and a reset monitor for monitoring a power-on/reset of said semiconductor device, and wherein said semiconductor device further comprises:
a protective section for protecting said pixels due to an unstable operation due to unstable data in said shift register upon power-on of said semiconductor device,
wherein said protective section performs a protecting of said pixels based on a combination of an output of said reset monitor and an output of said power supply monitor.

* * * * *